United States Patent
Li et al.

(10) Patent No.: US 10,144,845 B2
(45) Date of Patent: Dec. 4, 2018

(54) CARDANOL MODIFIED EPOXY POLYOL

(71) Applicant: Dow Global Technologies LLC, Midland, MI (US)

(72) Inventors: Jiang Li, Shanghai (CN); Yi Zhang, Witchita, KS (US); Wei Li, Shanghai (CN); Beilei Wang, Shanghai (CN); Paolo Diena, Modena (IT)

(73) Assignee: Dow Global Technologies LLc, Midland, MI (US)

( * ) Notice: Subject to any disclaimer, the term of this patent is extended or adjusted under 35 U.S.C. 154(b) by 211 days.

(21) Appl. No.: 15/029,691

(22) PCT Filed: Nov. 27, 2013

(86) PCT No.: PCT/CN2013/087970
§ 371 (c)(1),
(2) Date: Apr. 15, 2016

(87) PCT Pub. No.: WO2015/077944
PCT Pub. Date: Jun. 4, 2015

(65) Prior Publication Data
US 2016/0257848 A1    Sep. 8, 2016

(51) Int. Cl.
| | |
|---|---|
| *C08G 18/58* | (2006.01) |
| *C08G 18/40* | (2006.01) |
| *C09D 175/04* | (2006.01) |
| *C08G 18/48* | (2006.01) |
| *C08G 18/66* | (2006.01) |
| *C08G 18/76* | (2006.01) |
| *C08G 18/08* | (2006.01) |
| *C08G 18/36* | (2006.01) |
| *B29C 70/32* | (2006.01) |
| *B29C 70/56* | (2006.01) |
| *B29K 75/00* | (2006.01) |

(52) U.S. Cl.
CPC ....... *C09D 175/04* (2013.01); *C08G 18/0885* (2013.01); *C08G 18/36* (2013.01); *C08G 18/4045* (2013.01); *C08G 18/4829* (2013.01); *C08G 18/4837* (2013.01); *C08G 18/58* (2013.01); *C08G 18/6696* (2013.01); *C08G 18/7664* (2013.01); *B29C 70/32* (2013.01); *B29C 70/56* (2013.01); *B29K 2075/00* (2013.01)

(58) Field of Classification Search
CPC .. C09D 175/04; C08G 18/0885; C08G 18/36; C08G 18/4045; C08G 18/4837; C08G 18/58; C08G 18/6696; C08G 18/7664
USPC ......................................................... 524/450
See application file for complete search history.

(56) References Cited

U.S. PATENT DOCUMENTS

| | | | |
|---|---|---|---|
| 3,345,401 A | 10/1967 | May | |
| 6,642,343 B2 | 11/2003 | Gilles et al. | |
| 7,393,465 B2 | 7/2008 | Niesten et al. | |
| 7,722,696 B2 | 5/2010 | Winter et al. | |
| 7,812,101 B2 | 10/2010 | Fenn et al. | |
| 8,378,135 B2 | 2/2013 | Prasad et al. | |
| 2003/0176561 A1 | 9/2003 | Joshi et al. | |
| 2005/0038222 A1 | 2/2005 | Joshi et al. | |
| 2005/0192423 A1 | 9/2005 | Niesten et al. | |
| 2006/0004115 A1* | 1/2006 | Ittara | C08G 18/36 521/155 |
| 2008/0274319 A1 | 11/2008 | Berksoy et al. | |
| 2009/0020039 A1* | 1/2009 | Fenn | C08L 63/00 106/218 |
| 2013/0036940 A1 | 2/2013 | Tanaka et al. | |

FOREIGN PATENT DOCUMENTS

| | | | |
|---|---|---|---|
| CN | 102482392 A * | 5/2012 | ............. C08G 18/10 |
| WO | 2003085022 | 10/2003 | |
| WO | 2006081685 A1 | 8/2006 | |

OTHER PUBLICATIONS

Ionescu et al., Polyols and Rigid Polyurethane Foams from Cashew Nut Shell Liquid , J Polym Environ., (2012) 20:647-658.
Suresh et al, Synthesis, Structure, and Properties of Novel Polyols from Cardanol and Developed Polyurethanes†, Ind. Eng. Chem. Res., 2005, 44, 4504-4512.

* cited by examiner

*Primary Examiner* — Kelechi C Egwim

(57) ABSTRACT

A cardanol modified epoxy polyol may be used for forming a polyurethane resin system for use in applications such as coatings and composites formed by filament winding. The polyurethane resin system includes an isocyanate-reactive component that has a first cardanol component and the cardanol-modified epoxy polyol, and includes an isocyanate component that includes at least one polyisocyanate. The cardanol-modified epoxy polyol is a reaction product of an epoxy component and an epoxy-reactive component at a ratio of epoxy groups to epoxy reactive groups from 1:0.95 to 1:5, and the epoxy-reactive component includes a second cardanol component.

10 Claims, No Drawings

CARDANOL MODIFIED EPOXY POLYOL

FIELD

Embodiments relate to a formulation, which includes a cardanol modified epoxy polyol, for forming polyurethane resins for use in applications such as composites formed by filament winding and coatings.

INTRODUCTION

A polyurethane resin is a product of a mixture that includes a polyisocyanate and a polyol. It is has been suggested that a polyurethane resin may be used for forming composites in a filament winding process, e.g., as discussed in U.S. Patent Publication No. 2003/0176561, and may be used for forming coatings, e.g., as discussed in U.S. Pat. No. 6,642,343. Further, the polyol used to form the polyurethane resin may have at least one petroleum based building block (such as ethylene oxide and/or propylene oxide). While such petrochemical based polyols are widely used, these polyols face many problems such as exhaustion of natural resources and fluctuations in price based on changes in oil price. In the epoxy based art of aqueous dispersions and coatings, it has been suggested that petrochemical based resins may be substituted with a biomass based resin that is a reaction product of an epoxy resin and a biomass derived compound such as cardanol at a ratio of epoxy groups to epoxy reactive groups from 1:0.2 to 1:0.8, e.g., as discussed in U.S. Pat. No. 7,812,101. However, such a partially modified biomass based resin may not be suitable for use in the polyurethane art. Accordingly, an epoxy and cardanol based formulation is sought for use as a polyol in the polyurethane art.

SUMMARY

Embodiments may be realized by providing a polyurethane resin system that includes an isocyanate-reactive component that has a first cardanol component and a cardanol-modified epoxy polyol, and includes an isocyanate component that includes at least one polyisocyanate. The cardanol-modified epoxy polyol is a reaction product of an epoxy component and an epoxy-reactive component at a ratio of epoxy groups to epoxy reactive groups from 1:0.95 to 1:5, and the epoxy-reactive component includes a second cardanol component.

DETAILED DESCRIPTION

Polyurethane resin systems (e.g., thermoset and/or thermoplastic) include a mixture having an isocyanate component and an isocyanate-reactive component. The polyurethane resin systems may be used in composites formed by filament winding and in coatings, which composites and coatings may be used in harsh environmental conditions. According to embodiments, moisture tolerance is achieved by using a natural oil derived cashew nutshell liquid, while still realizing mechanical performance and relatively long gel times. In particular, embodiments relate to a polyurethane resin that exhibits hydrophobicity (e.g., based on the use of long aliphatic chains), high mechanical performance (e.g., a tensile strength of at least 55 MPa), and relatively long gel times (e.g., from 30 minutes to 12 hours). Relatively long gel times are sought for use in filament winding processes and coatings in an effort to allow for improved application. The isocyanate component includes at least one polyisocyanate and the isocyanate-reactive component includes a polyol component having at least two polyols. According to embodiments, the polyol component includes at least one first cardanol component (e.g., a first cashew nutshell liquid) and at least one cardanol-modified epoxy (CME) polyol. The isocyanate component and/or the isocyanate-reactive component may include an optional additive component, which includes an additive such a curative agent, a catalyst, a surfactant, a plasticizer, a filler, a solvent, a chain extender, and/or a crosslinker.

The first cardanol component may be a by-product of cashew nut processing (e.g., may be extracted from a layer between a nut and a shell of a cashew nut). The first cardanol component may include at least 50 wt % (e.g., at least 60 wt %, at least 70 wt %, at least 80 wt %, at least 90 wt %, and/or 100 wt %) of the first cashew nutshell liquid, based on a total weight of the first cardanol component. The first cardanol component may have a cardanol content of at least 50 wt % (e.g., from 50 wt % to 80 wt %, from 55 wt % to 70 wt %, from 58 wt % to 65 wt %, etc.), based on a total weight of the first cardanol component. The first cardanol component includes cardanol as a primary component and may additionally include cardol, methylcardol, and/or anacardic acid as secondary components. For example, the first cardanol component may include from 20 wt % to 50 wt % (e.g., from 20 wt % to 45 wt %, from 20 wt % to 40 wt %, 30 wt % to 40 wt %, etc.) of cardol, with a remainder based on a total of 100 wt % of the first cardanol component being methylcardol and/or anacardic acid. The first cardanol component may be subjected to a heating process (e.g., at the time of extraction from the cashew nut), a decarboxylation process, and/or a distillation process. According to an exemplary embodiment, the first cardanol component is a decarboxylated cashew nutshell liquid that includes at least 58 wt % of cardanol and at least 35 wt % of cardol. The first cashew nutshell liquid of the first cardanol component is available, e.g., from HDSG Beijing Technology under the tradename F-120 series. Without intending to be bound by this theory, the first cardanol component may increase hydrophobicity, reduce viscosity, increase gel time of the polyurethane resin, and/or provide tensile strength.

The CME polyol is a reaction product of a mixture that includes an epoxy component and an epoxy-reactive component that has a cardanol component (and may include an optional phenol or phenol derivative component). The epoxy component and/or the epoxy-reactive component may include an optional additive component (e.g., that may include an additive such as a curative agent, a catalyst, a surfactant, a plasticizer, a filler, a solvent, a chain extender, and/or a crosslinker). A ratio of epoxy groups in the epoxy component to the epoxy reactive groups in the epoxy-reactive component is from 1:0.95 to 1:5.

The epoxy component for forming the CME polyol includes at least one epoxy resin. The at least one epoxy resin may account for 90 wt % to 100 wt % of the epoxy component, with any remainder being a portion or an entirety of the optional additive component. The cardanol component in the epoxy-reactive component for forming the CME polyol includes a second cardanol component (e.g., a second cashew nutshell liquid) that may be a by-product of cashew nut processing (e.g., may be extracted from a layer between a nut and a shell of a cashew nut). The second cardanol component has a cardanol content of at least 85 wt % (e.g., from 85 wt % to 100 wt %), based on a total weight of the second cardanol component. The second cardanol component includes cardanol as a primary component and may additionally include cardol, methylcardol, and/or anacardic acid as secondary components. The second cardanol component may be subjected to a heating process (e.g., at the time of extraction from the cashew nut), a decarboxylation process, and/or a distillation process. The second cardanol component may have a different composition than the first cardanol component in the isocyanate-reactive component. The epoxy-reactive component may include at least 50 wt % (e.g., at least 60 wt %, at least 70 wt %, at least 80 wt %, at least 90 wt %, and/or 100 wt %) of the second cashew nutshell liquid, based on a total weight of the epoxy-reactive component. A remainder of the epoxy-reactive component may be the phenol or phenol derivative component and/or the optional additive component.

The CME polyol includes an epoxy derived backbone and at least two secondary isocyanate reactive groups, i.e., secondary hydroxyl groups, for reaction with isocyanate groups in the isocyanate component. The CME polyol may allow for adjustment of curing time, e.g., based on the slower reactivity of secondary isocyanate reactive groups relate to primary isocyanate reactive groups. The epoxy backbone may act as a building block and determine the functionality number and chemical structure of the resultant CME polyol. Synthesis of the CME polyol includes a reaction between cardanol in the second cardanol component and an opened epoxy resin produced from a ring-opening reaction of the epoxy resin in the epoxy component. For example, the CME polyol includes a cardanol linkage with the ring opened epoxy resin, which results in an ether bond between the opened epoxy resin and the cardanol.

According to exemplary embodiments, the CME polyol may include a compound having the following Formula 1 when synthesis is carried out using an epoxy resin, which has two epoxide moieties and a resin backbone, and the second cardanol component, which has therein at least mono-unsaturated cardanol:

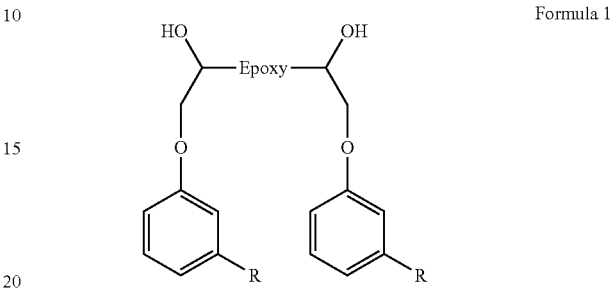

Formula 1

In the above Formula 1, the R groups are independently equal to $C_{15}H_{31-n}$ (in which n=0, 2, 4, or 6) or $C_{17}H_{33-n}$ (in which n=0, 2, or 4). In particular, the R group is independently a saturated or unsaturated straight alkyl chain that includes fifteen or seventeen carbon atoms, and the CME polyol may be derived from a cardanol mixture that variously includes cardanols having different R groups. The Epoxy in Formula 1 is the epoxy resin derived backbone.

According to an exemplary embodiment, the synthesis of a CME polyol using a bisphenol A based diepoxide resin and the second cardanol component that has therein at least mono-unsaturated cardanol, includes the following reaction stage:

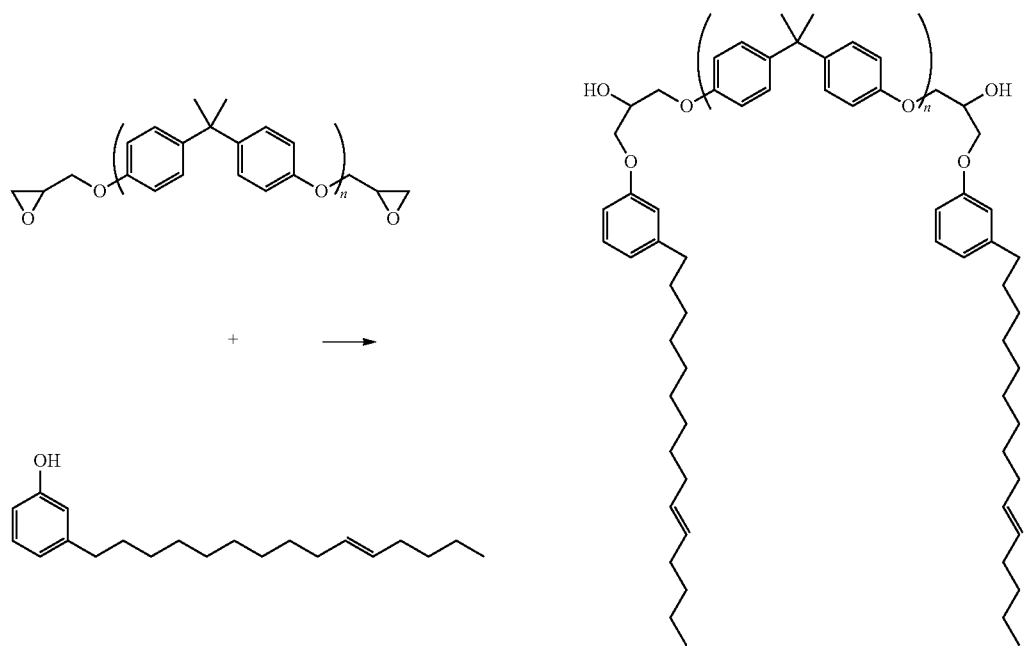

According to another exemplary embodiment, the synthesis of a CME polyol using an aliphatic diepoxide epoxy resin and the second cardanol component that has therein at least mono-unsaturated cardanol, includes the following reaction stage:

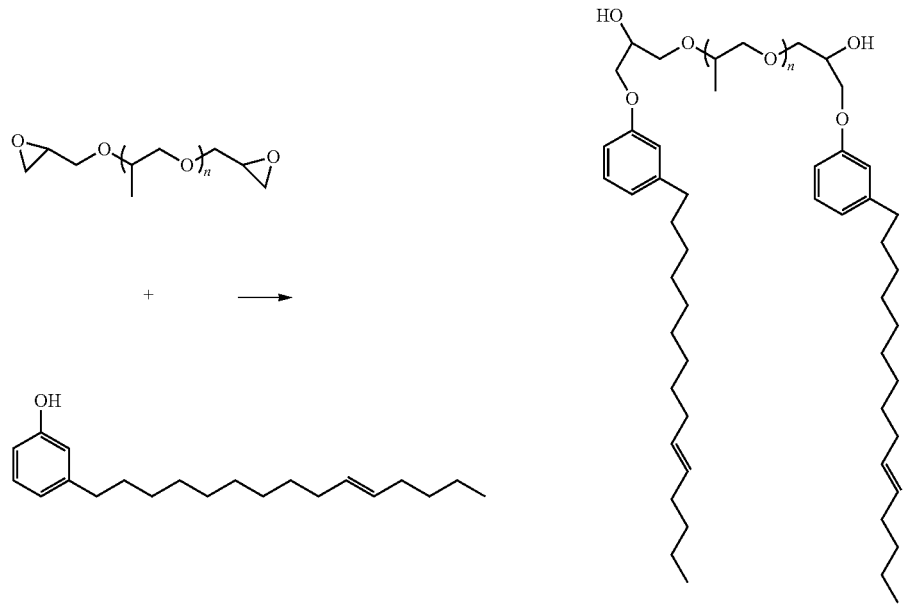

Other exemplary CME polyol structures that are synthesized using various aromatic epoxy resins and the second cardanol component include the following:

-continued

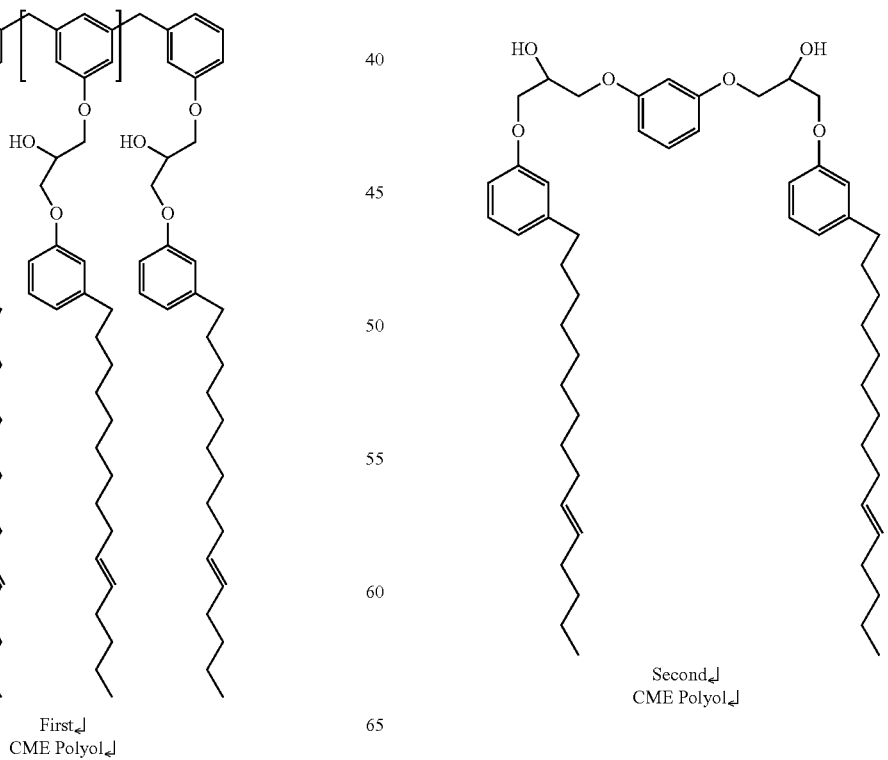

First CME Polyol

Second CME Polyol

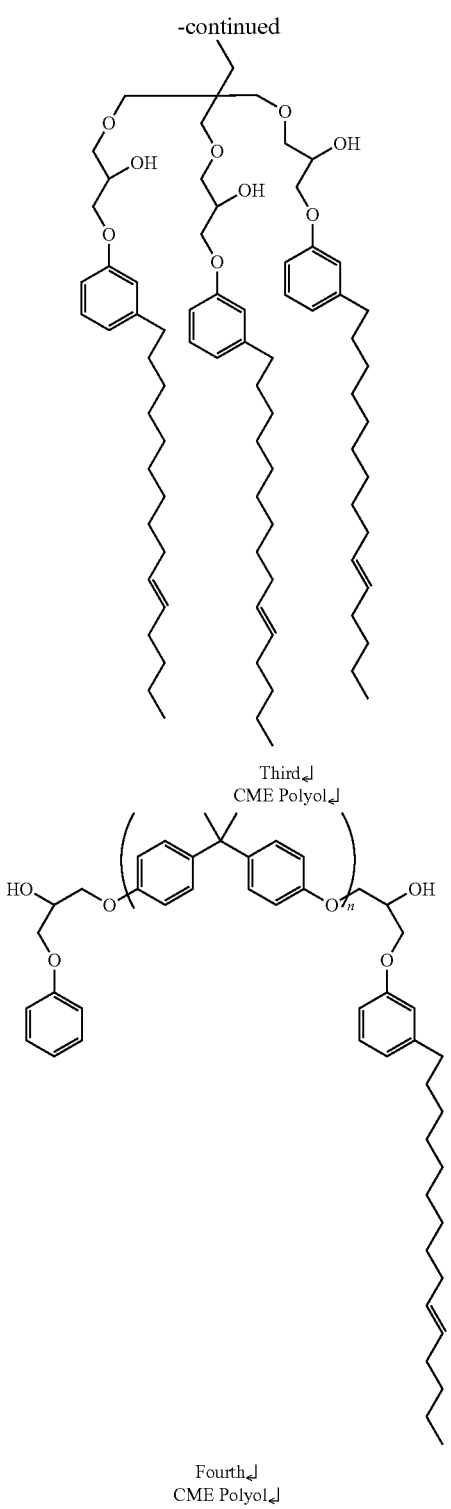

The First CME Polyol, above, is synthesized using an aromatic polyepoxide based resin and mono-unsaturated cardanol. The Second CME Polyol, above, is synthesized using a phenyl diepoxide resin and mono-unsaturated cardanol. The Third CME Polyol, above, is synthesized using an aliphatic polyepoxide based resin and mono-unsaturated cardanol. The Fourth CME Polyol, above, is synthesized using a bisphenol A based diepoxide resin, phenol, and mono-unsaturated cardanol.

Without intending to be bound by this theory, the cardanol in the CME polyol may introduce hydrophobicity into the resultant polyurethane resin. The increased hydrophobicity may be expressed as a low water absorbance in humid conditions, e.g., a low water absorbency measured as less than 1.0 wt % (e.g., less than 0.7 wt %) increase in weight of the polyol component at the conditions of 60% humidity and 23° C. after 30 minutes and less than 2.0 wt % increase in weight of the polyol component at the conditions of 60% humidity and 23° C. after 60 minutes. Further, hydrolysis and bubbling (e.g., the effect of bubbles being generated by carbon dioxide release from a reaction between water and an isocyanate component in the reaction mixture), may be reduced and/or avoided. The epoxy resin derived backbone of the CME polyol may provide property improvements such as mechanical performance and material compatibility to the polyurethane resin. Mechanical performance and/or other desired properties of the CME polyol may be adjusted in view of the alkyl chain moiety on the cardanol in the second cardanol component. Phenol or phenol derivatives added into the reaction mixture for forming the CME polyol may initialize the epoxy group ring-opening reaction, while the second cardanol component may offer hydrophobicity characteristics and anti-hydrolysis performance.

Exemplary epoxy resins for the epoxy component include polyepoxides that have at least two epoxide moieties per molecule (e.g., the epoxy resin may have a 2 to 10 epoxide functionality, a 2 to 6 epoxide functionality, a 2 to 4 epoxide functionality, etc.). The epoxy resin backbone may be saturated or unsaturated, aliphatic, cycloaliphatic, aromatic, or heterocyclic and may be substituted (e.g., contain at least one substituent such as halogen, hydroxyl, and/or ether groups). The epoxy resin may be monomeric or polymeric. The epoxy resin may have an equivalent epoxy weight (EEW) from 20 g/eq to 1000 g/eq (e.g., 30 g/eq to 800 g/eq, 50 g/eq to 600 g/eq, 100 g/eq to 500 g/eq, etc.), which EEW is the measure of the number of grams of resin for one chemical equivalent of an epoxy group. Exemplary epoxy resins include bisphenol A diglycidyl ether, bisphenol F diglycidyl ether, resorcinol diglycidyl ether, and triglycidyl ethers of para-aminophenols. The epoxy resin component may include an epoxy resin that is commercially available, e.g., from The Dow Chemical Company under the tradenames D.E.R. and D.E.N. The viscosity and cost of the resultant CME polyol may be controlled by the choice of the epoxy resin used in the epoxy component.

The second cardanol component includes at least 85 wt % (e.g., 85 wt % to 100 wt %, 90 wt % to 99 wt %, 91 wt % to 98 wt %, 92 wt % to 98 wt %, 93 wt % to 98 wt %, etc.) of cardanol, based on a total weight of the second cardanol component. The second cardanol component may include less than 8.5 wt % (e.g., from 0.5 wt % to 8 wt %, from 0.5 wt % to 5 wt %, 0.5 wt % to 3 wt %, etc.) of cardol, with a remainder based on a total of 100 wt % being methylcardol and/or anacardic acid. According to an exemplary embodiment, the second cardanol component consists essentially of a decarboxylated cashew nutshell liquid that includes at least 92 wt % (e.g., 92 wt % to 100 wt %, 94 wt % to 100 wt %, etc.) of cardanol, based on a total weight of the decarboxylated cashew nutshell liquid. The second cashew nutshell liquid is available, e.g., from HDSG Beijing Technology under the tradename F-180 series. The decarboxylated cashew nutshell liquid may be exposed to at least one distillation process.

The optional phenol or phenol derivative component includes at least one phenol and/or at least one phenol derivative. The reaction mixture may include the optional phenol or phenol derivative component at a molar ratio from 0.5:1.5 to 1.5:0.5 (e.g., 0.8:1.2 to 1.2:0.8, 0.9:1.1 to 1.1:0.9, etc.) for the moles of the phenol or phenol derivative to the moles of the second cardanol component in the reaction mixture. For example, the molar amount of the second cardanol component used may be reduced based on the molar amount of the phenol or phenol derivative used. Exemplary phenol derivatives include a naphthol based compound, a phenylphenol based compound, and a hexachlorophene based compound.

Exemplary catalysts for the optional additive component include quaternary ammonium compounds, phosphonium compounds, sulfonium compounds, tertiary amines, metal hydroxides, and metal alkoxides. The reaction between the epoxy component and the epoxy reactive component may be carried out neat or in the presence of an inert organic solvent. Exemplary solvents include ketone (such as methyl isobutyl ketone and/or methyl amyl ketone), toluene, xylene, and glycol ethers (such as the dimethyl ether of diethylene glycol). The reaction for forming the CME polyol may be conducted at a temperature of 120° C. to 180° C., e.g., for 1 hour to 48 hours.

In the reaction mixture for forming the CME polyol, the ratio of epoxy groups in the epoxy component to the epoxy reactive groups in the epoxy-reactive component is from 1:0.95 to 1:5 (e.g., 1:0.98 to 1:4, 1:0.99 to 1:3, 1:1 to 1:2.5, 1:1 to 1:1.1, etc.). For example, the excess of epoxy reactive groups provided from the cardanol component may enable sufficient conversion of the epoxy resin to the CME polyol and/or provide low viscosity to the reaction mixture (which low viscosity also enables sufficient conversion). An epoxy residue left in the resultant reaction product of the reaction mixture for forming the CME polyol, may be less than 0.2 wt %, based on a total weight of the resultant reaction product. For example, an epoxide equivalent weight of the resultant reaction product may be at least 8,000 grams/equivalent (e.g., from 9,000 g/eq to 100,000 g/eq, from 20,000 g/eq to 100,000 g/eq, from 30,000 g/eq to 100,000 g/eq, etc.), as measured according to ASTM D1652. A hydroxyl value of the resultant reaction mixture may be at least 40 mgKOH/g (e.g., from 40 mgKOH/g to 300 mgKOH/g, 60 mgKOH/g to 200 mgKOH/g, 80 mgKOH/g to 100 mgKOH/g, etc.), as measured according to ASTM D4274. The hydroxyl value may account for the CME polyol and unreacted hydroxyl groups in the epoxy-reactive component.

According to an exemplary embodiment, full conversion (i.e., a conversion rate of at least 93%) of the epoxy groups in the reaction mixture for forming the CME polyol to hydroxyl groups may be realized. According to exemplary embodiments, the reaction mixture that forms the CME polyol may have a conversion rate of 95% of the epoxy groups to hydroxyl groups and an EEW of at least 9,000 g/eq or a conversion rate of 98.5% of the epoxy groups to hydroxyl groups and an EEW of at least 30,000 g/eq. For example, full conversion may be demonstrated by gel permeation chromatography (GPC) spectra characterization, which may indicate that the lower molecular weight epoxy component has essentially reacted out resulting in full conversion to the higher molecular weight CME polyol. Full conversion may be demonstrated by Fourier transform infrared (FTIR) spectrometry, which may indicate that the infrared pattern corresponding to the epoxy component is essentially not present or is present in a negligible amount in the infrared pattern corresponding to the CME polyol. Full conversion may be demonstrated by nuclear magnetic resonance spectrometry, which may indicate that the magnetic properties pattern corresponding to the epoxy component is essentially not present or is present in a negligible amount in the magnetic properties pattern corresponding to the CME polyol.

To form the polyurethane resin (e.g., a gel polyurethane), a reaction mixture that includes the isocyanate-reactive component and the isocyanate component is formed. The isocyanate-reactive component includes at least the first cardanol component and the CME polyol and may optionally include at least one other polyol, which form the polyol component of the isocyanate-reactive component. The at least one other polyol may be a polyether polyol or a polyester polyol. The at least one other polyol may have a petroleum based building block (e.g., propylene oxide, ethylene oxide, and/or butylene oxide) or a natural oil derived building block. According to exemplary embodiments, a propylene oxide-glycerine based polyol, a poly(tetramethylene ether) glycol based polyol, a polypropylene glycol based polyol, and/or a polybutadiene based polyol may be used in the isocyanate-reactive component. For example, a propylene oxide based polyether (such as one available under the tradename VORANOL™ from The Dow Chemical Company) and/or a natural oil derived polyol (such as castor oil) may be used in the isocyanate-reactive component.

For example, the isocyanate-reactive component may include at least one low molecular weight polyol (e.g., a low molecular weight propylene oxide-glycerine based polyol), which has a number average molecular weight of less than 500 g/mol. The isocyanate-reactive component may include at least one high hydroxyl number polyol (e.g., a high hydroxyl number propylene oxide and sorbitol or sucrose initiated polyol), which has an average hydroxyl number from 260 to 800 mg KOH/g (e.g., 400 to 600 mg KOH/g, etc.). According to exemplary embodiments, the isocyanate-reactive component may include from 5 wt % to 30 wt % of the first cardanol component, from 15 wt % to 50 wt % of the CME polyol, and from 15 wt % to 45 wt % of the at least one other polyol, based on a total weight of the isocyanate-reactive component. For example, a ratio of the CME polyol to the first cardanol component may be from 0.9:1 to 2.5:1. An amount by weight of the CME polyol in the isocyanate-reactive component may be greater than an amount by weight of the first cardanol component.

According to an exemplary embodiment, the isocyanate-reactive component may include from 15 wt % to 45 wt % (e.g., 20 wt % to 40 wt %, 25 wt % to 35 wt %, 30 wt % to 35 wt %, etc.) of the at least one low molecular weight polyol, based on the total weight of the isocyanate-reactive component. According to another exemplary embodiment, the isocyanate-reactive component may include from 15 wt % to 45 wt % (e.g., 20 wt % to 40 wt %, 20 wt % to 30 wt %, 20 wt % to 25 wt %, etc.) of the at least one high hydroxyl number polyol, based on the total weight of the isocyanate-reactive component. According to yet another exemplary embodiment, the isocyanate-reactive component may include from 15 wt % to 45 wt % (e.g., 20 wt % to 40 wt %, 30 wt % to 40 wt %, 35 wt % to 40 wt %, etc.) of both the at least one low molecular weight polyol and the at least one high hydroxyl number polyol, based on the total weight of the isocyanate-reactive component.

In addition to the at least one low molecular weight polyol and/or the at least one high hydroxyl number polyol, the isocyanate-reactive component may include from 5 wt % to 30 wt % (e.g., 5 wt % to 20 wt %, 9 wt % to 16 wt %, etc.) of a natural oil derived polyol that is different from the first and second cardanol components. For example, the natural oil derived polyol may be castor oil.

For example, the at least one other polyol of the isocyanate-reactive component includes at least one selected from the group of the low molecular weight polyol having a number average molecular weight less than 500 g/mol, the high hydroxyl number polyol having an average hydroxyl number from 260 to 800 mg KOH/g, and the natural oil derived polyol. For example, the isocyanate-reactive component includes the natural oil derived polyol and the low molecular weight polyol having a number average molecular weight less than 500 g/mol and/or the high hydroxyl number polyol having an average hydroxyl number from 260 to 800 mg KOH/g.

The isocyanate component includes at least one isocyanate such as diphenylmethane diisocyanate (MDI), toluene diisocyanate (TDI), m-phenylene diisocyanate, p-phenylene diisocyanate (PPDI), naphthalene diisocyanate (NDI), isophorone diisocyanate (IPDI), hexamethylene diisocyanate (HDI), and various isomers and/or derivatives thereof. Using at least one of its 2,4'-, 2,2'-, and 4,4'-isomers, MDI may have a polymeric, a copolymer, a mixture, or a modified polymer form. Exemplary MDI products are available from The Dow Chemical Company under the trade names ISONATE, PAPI, and VORANATE. Using at least one of its 2,4 and 2,6-isomers, TDI may have a polymeric, a copolymer, a mixture, or a modified polymer form. Exemplary TDI products are available from The Dow Chemical Company under the trade name VORANATE. According to an exemplary embodiment, the at least one isocyanate has an average functionality of from 2.8 to 3.2 (e.g., 2.2 to 2.9, etc.) and a free isocyanate group content (i.e., NCO content) of from 25 wt % to 35 wt % (e.g., 30 wt % to 32 wt %).

The isocyanate-reactive component may be reacted with the isocyanate component at an isocyanate index from 60 to 200 (e.g., 60 to 120, 80 to 150, 90 to 120, 100 to 115, etc.). The isocyanate index is measured as the equivalents of isocyanate in the reaction mixture for forming the polyurethane resin, divided by the total equivalents of isocyanate-reactive hydrogen containing materials in the reaction mixture, multiplied by 100. Considered in another way, the isocyanate index is the ratio of isocyanate-groups over isocyanate-reactive hydrogen atoms present in the reaction mixture, given as a percentage.

The optional additive component of the reaction mixture for forming the polyurethane resin may be in its entirety or partially mixed with the isocyanate component and/or the isocyanate-reactive component. According to an exemplary embodiment, a portion of the optional additive component is added to the isocyanate-reactive component before the reaction mixture is formed and another portion is separately added to the reaction mixture.

The optional additive component may include a zeolite such as a molecular sieve powder (e.g., available from Grace under the trade name SYLOSIV). For example, the zeolite may be a crystalline aluminosilicate. An amount of the zeolite may be from 1 wt % to 15 wt %, based on the total weight of the isocyanate-reactive component. Without intending to be bound by this theory, the zeolite may assist in blocking the water absorbed during a filament winding process.

The optional additive component may include an optional catalyst component that includes at least one catalyst. Exemplary catalysts include tertiary amines, Mannich bases formed from secondary amines, nitrogen-containing bases, alkali metal hydroxides, alkali phenolates, alkali metal alcoholates, hexahydrothiazines, and organometallic compounds. The viscosity of the isocyanate component may be reduced by the mixing diluents there within, e.g., diluents that are commercially available and are known to those skilled in the art may be used. Various other additives, e.g., those known to those skilled in the art, may be included in the optional additive component. For example, fillers such as inorganic and/or organic fillers, coloring agents, water-binding agents, surface-active substances, plant protection agents, extenders and/or plasticizers may be used.

Chain extenders and/or crosslinkers may be included in the optional additive component. For example, glycerin or trimethylolpropane may be included in an amount from 0.5 wt % to 10 wt % (e.g., 0.5 wt % to 5 wt %, etc.)

Dyes and/or pigments (such as titanium dioxide and/or carbon black), may be included in the optional additive component to impart color properties to the polyurethane resin. Pigments may be in the form of solids or a dispersion in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the polyurethane resin.

According to exemplary embodiments, the polyurethane resin may be formed by reacting the isocyanate-component with the isocyanate-reactive component to form a reaction product and then curing the reaction product. According to exemplary embodiments, the polyurethane resin are used in coatings or composites formed using filament winding The polyurethane resin may have a density from 0.2 kg/m$^3$ to 2 kg/m$^3$ (e.g., 0.2 kg/m$^3$ to 1.3 kg/m$^3$, etc.).

Filament winding is used for the production of composites, e.g., based on a crosslinking matrix of filaments and polyurethane resin. In a filament winding operation using the polyurethane resin according to embodiments, a filament may be passed through a liquid bath or an injection die and then wound around a mandrel in order to form a hollow cylindrical object. The polyurethane resin may be a one component system (e.g., the isocyanate component and the isocyanate-reactive component are mixed to form the liquid bath and then applied to the filament) or a two-component system (e.g., the isocyanate component and the isocyanate-reactive component are separately applied to the filament such that the liquid bath may include only one of the isocyanate component or the isocyanate-reactive component). The resultant product may be cured (e.g., by the application of heat and/or radiation) in order to form a final composite article.

In an exemplary filament winding process, the filament is wetted by the liquid bath and wound around the mandrel, which defines the shape of the final composite article. The wetting of the filament may take place either prior to or concurrently with the winding operation. For example, the filament may be wetted on a continuous basis by a one-component polyurethane resin just before it is wound around the mandrel. The winding operation may be accomplished by rotating the mandrel while the polyurethane resin coated filament is under a controlled amount of tension, and moving the filament up and down the length of the mandrel in any desired pattern. During the winding operation, it is important to minimize the formation of voids or gaps in the filament wound article and to control the degree of wetting of the filament (better wetting is preferred in most applications). For example, the coating of the polyurethane resin on the filament and the winding operation should both take place while the resin is still flowable (e.g., should be homogeneous and separation of solids or gel particles from the liquid bulk of the resin is minimal).

With respect to gel time of the polyurethane resin, a balance may be realized between the need for a quick cure time to form the final composition article, the need for adequate flowability of the polyurethane resin during the process of forming the composite material, and the need to prevent excessive wasteful flow of the polyurethane resin during the winding operation. The balance may be achieved by having a gel time that is from 30 minutes to 150 minutes. Gel time (i.e., string gel time) is determined as the interval between the time that the reactive components are first mixed to form a reacting liquid mixture until the reacting liquid mixture becomes stringy (i.e., the material has built enough molecular weight to transition from a liquid to a solid). In particular, the determination of stringing may be include repeatedly touching the reaction mixture with a stick and pulling the stick away from the liquid and stringing occurs when the material in the reaction mixture has polymerized to the point that a single or multiple filaments remain on the end of the stick.

Polyurethane resins may also be used as binders of choice in coating compositions, e.g., for flooring applications such as laminates. In this case, a balance may be realized between the need for a quick cure time to form the final flooring, the need for adequate flowability of the polyurethane resin during the process of forming the flooring, and the need to prevent excessive wasteful flow of the polyurethane resin during the manufacturing/installation process.

All percentages are by weight, unless indicated otherwise. All values for molecular weight are based on number average molecular weight, unless indicated otherwise.

Examples

The following materials are used:

D.E.R.™ 383 An aromatic epoxy resin that is a reaction product of epichlorohydrin and bisphenol A, having an epoxide equivalent weight of approximately 183 g/eq (available from The Dow Chemical Company).

XY694 An epoxy resin that is a resorcinol diglycidyl ether, having an epoxide equivalence of 118 to 134 g/eq (available from Anhui Hengyuan Chemical Company).

CNSL A A cashew nutshell liquid that includes 94 wt % of cardonal (available from Hua Da SaiGao [i.e., HDSG of Beijing] Technology).

CNSL B A cashew nutshell liquid that includes 60 wt % of cardonal (available from Hua Da SaiGao [i.e., HDSG of Beijing] Technology).

Catalyst A A catalyst that includes 70 wt % ethyltriphenylphosphonium acetate in methanol (available from Alfa Aesar).

VORANOL™ CP 260 A polyether polyol that is a glycerinepropoxylatedtriol, having a number average molecular weight of 255 g/mol (available from The Dow Chemical Company).

VORANOL™ CP 450 A polyether polyol that is a glycerinepropoxylatedtriol, having a number average molecular weight of 450 g/mol (available from The Dow Chemical Company).

VORANOL™ RN 490 An oxypropylenepolyether polyol that is sorbitol/glycerine-initiated, having an average hydroxyl number from 475 to 510 mg KOH/g and having an average functionality of 4.3 (available from The Dow Chemical Company).

Castor oil A natural oil derived polyol that is castor oil (available from Sigma-Aldrich).

Glycerin a glycerin solution (available from Sinopharm).

Zeolite A crystalline zeolite molecular sieve (available from Grace as SYLOSIV® A3).

BYK® A 530 A defoamer/air release additive that includes silicone (available from BYK Additives & Instruments).

VORANATE™ M 220 A polymeric diphenylmethane diisocyanate (MDI), having an NCO content of 30.9 wt % and a functionality of 2.7 (available from The Dow Chemical Company).

SpecFlex™ NS 540 A polymeric diphenylmethane diisocyanate (MDI), having an NCO content of 31.4 to 32.6 wt % and a functionality of 2.3 (available from The Dow Chemical Company).

A CME Polyol 1 is prepared by mixing D.E.R.™ 383 and CNSL A. In particular, approximately 182 grams of D.E.R.™ 383 and approximately 330 grams of CNSL A are added to a 4-necked round bottom flask (equipped with a thermometer, a mechanical stirrer, and a nitrogen connection) to form a reaction mixture for forming the CME Polyol 1. In the reaction mixture, a ratio of epoxy groups in the D.E.R™ to epoxy reactive hydroxyl groups in the CNSL A is approximately 1:2.2. Then, the flask is thoroughly purged and protected with nitrogen for 10 minutes. Next, agitation of the reaction mixture within the flask is started at room temperature and approximately 0.26 grams of Catalyst A is added into the reaction mixture, during which time period agitation is continued and heat is applied to the reaction mixture. Once a temperature of 160° C. is reached, that temperature is maintained for four hours. Thereafter, nitrogen protection is continued until the reaction mixture for forming the CME Polyol 1 has cooled to 40° C.

A CME Polyol 2 is prepared by mixing XY694 and CNSL A. In particular, approximately 125 grams of XY694 and approximately 330 grams of CNSL A are added to a 4-necked round bottom flask (equipped with a thermometer, a mechanical stirrer, and a nitrogen connection) to form a reaction mixture for forming the CME Polyol 2. In the reaction mixture, a ratio of epoxy groups in the D.E.R™ 383 to epoxy reactive hydroxyl groups in the CNSL A is approximately 1:2.2. Then, the flask is thoroughly purged and protected with nitrogen for 10 minutes. Next, agitation of the reaction mixture within the flask is started at room temperature and approximately 0.26 grams of Catalyst A is added into the reaction mixture, during which time period agitation is continued and heat is applied to the reaction mixture. Once a temperature of 160° C. is reached, that temperature is maintained for four hours. Thereafter, nitrogen protection is continued until the reaction mixture for forming the CME Polyol 2 has cooled to 40° C.

TABLE 1

| | Working Ex. 1 (wt %) | Working Ex. 2 (wt %) | Working Ex. 3 (wt %) | Working Ex. 4 (wt %) | Working Ex. 5 (wt %) | Working Ex. 6 (wt %) | Working Ex. 7 (wt %) | Comp. Ex. A (wt %) |
|---|---|---|---|---|---|---|---|---|
| Isocyanate-reactive component (wt % based on total weight of isocyanate-reactive component) | | | | | | | | |
| CME Polyol 1 | 30.0 | 30.0 | 40.0 | 23.8 | 18.8 | 23.8 | — | — |
| CME Polyol 2 | — | — | — | — | — | — | 30.0 | — |
| CNSL B | 13.8 | 23.8 | 23.8 | 20.0 | 20.0 | 20.0 | 13.8 | — |
| VORANOL ™ CP 260 | 31.0 | 31.0 | 31.0 | — | 31.0 | — | 31.0 | 50.0 |
| VORANOL ™ CP 450 | — | — | — | — | — | 31.0 | — | — |
| VORANOL ™ RN 490 | — | — | — | 31.0 | — | — | 5.0 | — |
| Castor Oil | 10.0 | 10.0 | — | 10.0 | 15.0 | 10.0 | 10.0 | 34.8 |
| Zeolite | 10.0 | — | — | 10.0 | 10.0 | 10.0 | 10.0 | 10.0 |
| Glycerin | 5.0 | 5.0 | 5.0 | 5.0 | 5.0 | 5.0 | — | 5.0 |
| BYK ® A530 | 0.2 | 0.2 | 0.2 | 0.2 | 0.2 | 0.2 | 0.2 | 0.2 |
| Isocyanate component | | | | | | | | |
| Ratio of total isocyanate-reactive component to VORANATE ™ M229 | | | | | | | | 1:1.20 |
| Ratio of total isocyanate-reactive component to SpecFlex ™ NS 540 | 1:0.96 | 1:1.02 | 1:1.01 | 1:0.85 | 1:0.98 | 1:0.83 | 1:0.96 | |
| Properties | | | | | | | | |
| Gel time of mixture (min) | 36 | 50 | 70 | 31 | 36 | 100 | 38 | 28 |
| Tensile Strength of Reaction Product (MPa) | 65.9 | 58.7 | 53.9 | 59.0 | 62.0 | 52.1 | 60.2 | 67.2 |

Working Examples 1-7 and Comparative Example A are prepared according to the formulations in Table 1, above. Each of Working Examples 1-7 and Comparative Example A include an isocyanate-reactive component, which includes therein a polyol component and other non-polyol additives, and an isocyanate component. The amount of the isocyanate component is based on a total parts by weight of the isocyanate-reactive component. Comparative Example A includes a polyol system that excludes any of the CME Polyol 1 and the CME Polyol 2.

The gel time is measured using a 200 gram sample, for which the gel time is measured as the time interval between the isocyanate-reactive component and the isocyanate component being mixed to form a reaction mixture and the reaction mixture becoming stringy (i.e., the time at which a stick that is inserting into the reaction mixture and then pulled out of the reaction mixture has a single or multiple filaments remaining on the end of the stick). The tensile strength is measured according to the ISO 527 test method.

Water absorbance comparisons are conducted by using polyol systems from Working Examples 1 to 7 and Comparative Example A. Samples having a weight of 20 grams of the polyol system are placed onto two pieces of A4 size printing paper under the conditions of 60% humidity and at 23° C. Further, the two layers of printing paper are clamped by two Teflon® rings and the spreading area of the polyol system samples are fixed by the rings to an area of 600 cm². In particular, 20 grams of each of the formulations in Table 1 (i.e., the polyol component for Working Examples 1 to 7 and Comparative Example A) are independently dipped onto the printing paper and spread out on the 600 cm² area inside Teflon® rings. After 30 minutes and sixty minutes, each of the samples are weighed to measure weight increase percent value, as shown below in Table 2.

TABLE 2

| | Working Ex. 1 | Working Ex. 2 | Working Ex. 3 | Working Ex. 4 | Working Ex. 5 | Working Ex. 6 | Working Ex. 7 | Comp. Ex. A |
|---|---|---|---|---|---|---|---|---|
| Weight Increase after 30 minutes (wt %) | +0.7 | +0.3 | +0.2 | +0.9 | +0.8 | +0.6 | +0.9 | +2.1 |
| Weight Increase after 60 minutes (wt %) | +1.2 | +1.1 | +0.6 | +1.5 | +1.6 | +1.1 | +1.4 | +2.7 |

Working Examples 1 to 7 realize longer gel time and achieve similar mechanical properties with respect to Comparative Example A. The formulations of Working Examples 1 to 7 assist in decreasing the amount of water/moisture absorbed from the environment.

The invention claimed is:

1. A polyurethane resin system, comprising:
   an isocyanate-reactive component that includes a first cardanol component and a cardanol-modified epoxy polyol, the cardanol-modified epoxy polyol being a reaction product of an epoxy component and an epoxy-reactive component at a ratio of epoxy groups to epoxy reactive groups from 1:0.95 to 1:5, the epoxy-reactive component including a second cardanol component, and
   an isocyanate component that includes at least one polyisocyanate.

2. The polyurethane resin system as claimed in claim 1, wherein:
   the first cardanol component has a cardanol content that is from 50 wt % to 80 wt % and cardol content that is from 20% to 50%, based on a total weight of the first cardanol component, and
   the second cardanol component has a cardanol content of at least 85 wt %, based on a total weight of the second cardanol component.

3. The polyurethane resin system as claimed in claim 1, wherein the cardanol content in the second cardanol component is from 90 wt % to 99 wt % and a cardol content in the second cardanol component is from 0.5 wt % to 8 wt %, based on the total weight of the cashew nutshell liquid.

4. The polyurethane resin system as claimed in claim 1, wherein the isocyanate-reactive component includes from 5 wt % to 30 wt % of the first cardanol component, from 15 wt % to 50 wt % of the cardanol-modified epoxy polyol, and from 15 wt % to 45 wt % of at least one other polyol, based on a total weight of the isocyanate-reactive component.

5. The polyurethane resin system as claimed in claim 4, wherein the at least one other polyol includes at least one selected from the group of a low molecular weight polyol having a number average molecular weight less than 500, a high hydroxyl number polyol having an average hydroxyl number from 260 to 800 mg KOH/g, and a natural oil derived polyol.

6. The polyurethane resin system as claimed in claim 1, wherein the isocyanate-reactive component includes from 1 wt % to 15 wt % of a zeolite.

7. The polyurethane resin system as claimed in claim 1, wherein an isocyanate index of the reaction system is from 60 to 200.

8. A coating including the polyurethane resin system as claimed in claim 1.

9. A composite material produced with the polyurethane resin system as claimed in claim 1.

10. A process for forming a composite material with filament winding, the method comprising:
    coating a filament with the polyurethane resin system as claimed in claim 1 to form a coated filament,
    winding the coated filament around a mandrel, and
    curing the coated filament to form a composite material.

* * * * *